United States Patent
Oh et al.

(10) Patent No.: US 9,391,930 B2
(45) Date of Patent: *Jul. 12, 2016

(54) CPM SERVICE PROVISIONING SYSTEM AND METHOD FOR INTERWORKING WITH NON-CPM SERVICE

(71) Applicant: Samsung Electronics Co., Ltd., Gyeonggi-do (KR)

(72) Inventors: Jae-Kwon Oh, Seoul (KR); Seung-Yong Lee, Seoul (KR); Kyung-Tak Lee, Gyeonggi-do (KR); Sung-Jin Park, Gyeonggi-do (KR); Ji-Hye Lee, Gyeonggi-do (KR); Wuk Kim, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 103 days.

This patent is subject to a terminal disclaimer.

(21) Appl. No.: 14/189,453

(22) Filed: Feb. 25, 2014

(65) Prior Publication Data

US 2014/0181188 A1 Jun. 26, 2014

Related U.S. Application Data

(63) Continuation of application No. 12/867,718, filed as application No. PCT/KR2009/000639 on Feb. 11, 2009, now Pat. No. 8,676,879.

(30) Foreign Application Priority Data

Mar. 31, 2008 (KR) .................. 10-2008-0030069

(51) Int. Cl.
*G06F 15/16* (2006.01)
*H04L 12/58* (2006.01)
(Continued)

(52) U.S. Cl.
CPC ............ *H04L 51/00* (2013.01); *H04L 51/066* (2013.01); *H04L 51/36* (2013.01);
(Continued)

(58) Field of Classification Search
CPC ....... H04L 51/00; H04L 51/066; H04L 51/36; H04L 65/1006; H04L 67/02; H04M 3/5307; H04M 2203/4509; H04W 4/12; H04W 80/10; H04W 92/02

USPC .......................... 709/201, 202, 203, 206–207; 715/700–866
See application file for complete search history.

(56) References Cited

U.S. PATENT DOCUMENTS 7,283,839 B2 10/2007 You et al.
8,327,024 B2* 12/2012 Pattison .................. H04L 12/66
455/466
(Continued)

FOREIGN PATENT DOCUMENTS

EP 2124399 11/2009
KR 1020070023496 2/2007
(Continued)

OTHER PUBLICATIONS

PCT/ISA/237 Written Opinion issued in PCT/KR2009/000639 (10pp).
(Continued)

*Primary Examiner* — Alina N Boutah
*Assistant Examiner* — Davoud Zand
(74) *Attorney, Agent, or Firm* — The Farrell Law Firm, P.C.

(57) ABSTRACT

A Converged-Internet Protocol (IP) Messaging (CPM) service provisioning method and system are provided including a CPM server. The CPM server includes an eXtension Markup Language (XML) Document Management (XDM) client for sending a request for preference information of a recipient terminal to which the CPM message is to be delivered, and receiving the preference information in response to the request from an XDM server that stores and manages the preference information of the recipient terminal; and an interworking selection entity for determining a non-CPM service to be subjected to interworking depending on the received preference information, and delivering the CPM message to an interworking server that interworks with the determined non-CPM service.

36 Claims, 5 Drawing Sheets

(51) Int. Cl.
  *H04M 3/53* (2006.01)
  *H04W 4/12* (2009.01)
  *H04L 29/06* (2006.01)
  *H04W 80/10* (2009.01)
  *H04W 92/02* (2009.01)
  *H04L 29/08* (2006.01)

(52) U.S. Cl.
  CPC ........ *H04L 65/1006* (2013.01); *H04M 3/5307* (2013.01); *H04W 4/12* (2013.01); *H04L 67/02* (2013.01); *H04M 2203/4509* (2013.01); *H04W 80/10* (2013.01); *H04W 92/02* (2013.01)

(56) References Cited

U.S. PATENT DOCUMENTS

| | | | |
|---|---|---|---|
| 2005/0185661 A1* | 8/2005 | Scott | H04L 29/06 370/401 |
| 2005/0243978 A1* | 11/2005 | Son | H04L 12/66 379/88.13 |
| 2006/0083358 A1 | 4/2006 | Fong et al. | |
| 2007/0259651 A1* | 11/2007 | Bae | H04L 29/06027 455/412.1 |
| 2008/0192733 A1* | 8/2008 | Song | H04L 65/1016 370/352 |
| 2008/0256263 A1* | 10/2008 | Nerst | H04L 29/08846 709/250 |
| 2009/0187919 A1* | 7/2009 | Maes | H04L 65/1016 719/313 |
| 2009/0279455 A1* | 11/2009 | Wang et al. | 370/260 |

FOREIGN PATENT DOCUMENTS

| | | |
|---|---|---|
| WO | WO 2007/068195 | 6/2007 |
| WO | WO2007119902 | 10/2007 |

OTHER PUBLICATIONS

OMA, Converged IP Messaging Requirements, Candidate Version 1.0, Open Mobile Alliance, OMA-RD-CPM-V1_0-20071106-C, Nov. 6, 2007.
OMA, Converged IP Messaging Architecture, Draft Version 1.0, Open Mobile Alliance, OMA-AD-CPM-V1_0-20071214-D, Dec. 14, 2007.
OMA, XML Document Management (XDM) Specification, Candidate Version 2.0, Open Mobile Alliance, OMA-TS-XDM_Core-V2_0-20071123-C, Nov. 23, 2007.
OMA, Shared Policy XDM Specification, Candidate Version 1.0, Open Mobile Alliance, OMA-TS-XDM_Shared_Policy-V1_0-20070724-C, Jul. 24, 2007.
OMA, XDM-XDM2-Extensions, Version 1.0, Open Mobile Alliance, OMA-SUP-XSD_xdm_extensions-V1_0-20070724-C, Jul. 24, 2007.
3GPP, 3rd Generation Partnership Project; Technical Specification Group Core Network and Terminals; IP Multimedia (IM) Subsystem Cx and Dx Interfaces; Signalling Flows and Message Contents (Release 8), 3GPP TS 29.228 V8.0.0, Dec. 2007.
OMA, IW Flows, Open Mobile Alliance, OMA-TS-CPM_System_Description-V1_0-20071214-D, Feb. 1, 2008.
OMA, User Preferences Profiles Proposal, Open Mobile Alliance, OMA-MWG-2007-0277, Dec. 1, 2007.
OMA, User Preference for IW, Open Mobile Alliance, OMA-MWG-CPM-2008-0065-INP_User_Preference_for_IW, Feb. 13, 2008.
Anett Schulke, NEC, "Description of CPM Capability Center as Core Server Functionality for Conversation Control", CPM AD, Open Mobile Alliance, Apr. 30, 2007.
Youngae Kim, Research in Motion, "Addition of XDM Function and Clarification of XDM Sections", OMA-AD-CPM-V1_0-20071116-D, Open Mobile Alliance, Dec. 2, 2007.
Wang Shanshan, China Mobile, "CPM Interworking Function", Open Mobile Alliance, Apr. 3, 2007.
European Search Report dated Oct. 17, 2014 issued in counterpart application No. 09711429.2-1862.

* cited by examiner

CPM SERVICE PROVISIONING SYSTEM AND METHOD FOR INTERWORKING WITH NON-CPM SERVICE

PRIORITY

This application is a Continuation of U.S. Ser. No. 12/867,718, which was filed in the U.S. Patent and Trademark Office on Aug. 13, 2010, as a National Stage entry of PCT/KR2009/000639, and claims priority to Korean Patent Application Nos. 10-2008-0013229 and 10-2008-0030069, which were filed in the Korean Intellectual Property Office on Feb. 13, 2008 and Mar. 31, 2008, respectively, the content of each of which is incorporated herein by reference.

BACKGROUND OF THE INVENTION

1. Field of the Invention

The present invention relates generally to a system and method for provisioning a CPM service, and in particular, to a CPM service provisioning system and method capable of interworking with non-CPM services.

2. Description of the Related Art

A Converged-IP Messaging (CPM) service has been proposed to provide, in a single-service type, key service features of various existing messaging services such as Short Messaging Service (SMS), Multimedia Messaging Service (MMS), Instant Messaging Service (IMS), etc.

The advent of such a CPM service is attributable to the need to integrate the above existing services, which have developed based on different technologies, into one service as the services overlap each other in many points in the light of user experiences. In addition, with the rapid change in the market of enterprises and their communication businesses, users have an increasing demand for handling various types of their received messages in an integrated (converged) manner. Considering this, the Open Mobile Alliance (OMA) standard organization recently plans to develop a technology for a new service called a CPM service.

The CPM service should be able to deliver a message sent by a sender to a recipient to the utmost regardless of the type of the messaging service that the recipient enjoys.

As described above, the CPM service should be able to handle messages exchanged with all existing service users in an integrated manner regardless of the types of the messages. To this end, the CPM service must be able to interwork with non-CPM services such as Short Messaging Service, Multimedia Messaging Service, Instant Messaging Service, Push-To-Talk (PTT) over Cellular (PoC), etc. The term 'interworking' as used herein means a mutual conversion operation between a message format of the CPM service and a message format of the non-CPM service. However, these messaging services are equal in their purpose of message delivery between a sender and a recipient, but different in the way of providing messages. Accordingly, there is a demand for a method in which the CPM service can efficiently interwork with such messaging services regardless of the message types.

SUMMARY OF THE INVENTION

Accordingly, the present invention is designed to address at least the problems and/or disadvantages and to provide at least the advantages described below.

An aspect of the present invention is to provide a CPM service provisioning system and method capable of interworking with non-CPM services.

Another aspect of the present invention is to provide a CPM service provisioning system and method capable of efficiently achieving interworking regardless of a messaging service of a recipient.

According to an aspect of the present invention, a CPM service provisioning system is provided comprising a CPM server. The CPM server includes an eXtension Markup Language (XML) Document Management (XDM) client for sending a request for preference information of a recipient terminal to which the CPM message is to be delivered, and receiving the preference information in response to the request from an XDM server that stores and manages the preference information of the recipient terminal; and an interworking selection entity for determining a non-CPM service to be subjected to interworking depending on the received preference information, and delivering the CPM message to an interworking server that interworks with the determined non-CPM service.

According to another aspect of the present invention, a method is provided for interworking with a non-Converged-Internet Protocol (IP) Messaging (CPM) service in a CPM service provisioning system. The method includes sending, by a CPM server, a request for preference information of a recipient terminal to which the CPM message is to be delivered; receiving, by the CPM server, the preference information in response to the request from an eXtension Markup Language (XML) Document Management (XDM) server that stores and manages the preference information of the recipient terminal; determining, by the CPM server, a non-CPM service to be subjected to interworking depending on the received preference information; and delivering, by the CPM server, the CPM message to an interworking server that interworks with the determined non-CPM service.

According to another aspect of the present invention, a CPM service provisioning system is provided for interworking with a non-CPM service. The system includes an interworking selection entity for sending, to an eXtension Markup Language (XML) Document Management (XDM) server, a request for preference information of a recipient terminal to which the CPM message is to be delivered, determining the non-CPM service to be subjected to the interworking depending on the preference information from the XDM server, and delivering the CPM message to an interworking server that interworks with the determined non-CPM service; and a CPM server for sending, to the XDM server, a request for the preference information of the recipient terminal to which the CPM message is to be delivered, determining whether to perform the interworking depending on the preference information from the XDM server, and sending the CPM message to the interworking selection entity, when the CPM server determines to perform the interworking.

According to another aspect of the present invention, a non-Converged-Internet Protocol (IP) Messaging (CPM) service terminal is provided, which includes a processor for generating preference information to interwork with a CPM service terminal; a transceiver for transmitting the preference information to an eXtension Markup Language (XML) Document Management (XDM) server that stores and manages the preference information and for receiving a converted message from an interworking server, wherein a message format of the converted message corresponds to a non-CPM service that is subjected to interworking depending on the preference information; and an interworking selection entity for determining the non-CPM service to be subjected to the interworking depending on the received preference information, and delivering the CPM message to an interworking server that interworks with the determined non-CPM service.

According to another aspect of the present invention, a method is provided for interworking with a non-Converged-Internet Protocol (IP) Messaging (CPM) service in a CPM service provisioning system. The method includes generating, by a terminal, preference information to interwork with a CPM service terminal; transmitting, by the terminal, the preference information to an eXtension Markup Language (XML) Document Management (XDM) server that stores and manages the preference information; and receiving, by the terminal, a converted message from an interworking server. A message format of the converted message corresponds to a non-CPM service which is subjected to interworking, depending on the preference information.

According to another aspect of the present invention, an interworking server is provided, which includes a transceiver for receiving a Converged-Internet Protocol (IP) Messaging (CPM) message which is selectively delivered from a CPM server based on preference information of a recipient terminal; and a processor for converting the CPM message into a non-CPM message corresponding to a non-CPM service which is subjected to interworking depending on the preference information. The transceiver delivers the converted non-CPM message to the recipient terminal.

According to another aspect of the present invention, a method is provided for interworking with a non-Converged-Internet Protocol (IP) Messaging (CPM) service in a CPM service provisioning system. The method includes receiving, by an interworking server, a Converged-IP Messaging (CPM) message which is selectively delivered from a CPM server based on preference information of a recipient terminal; converting, by the interworking server, the CPM message into a non-CPM message corresponding to a non-CPM service which is subjected to interworking depending on the preference information; and delivering, by the interworking server, the converted non-CPM message to the recipient terminal.

According to another aspect of the present invention, an XDM server is provided, which comprises a memory for storing preference information of a recipient terminal; and a transceiver for receiving request for the preference information of the recipient terminal to which a Converged-Internet Protocol (IP) Messaging (CPM) message is to be delivered, and providing the stored preference information to the CPM server in response to the request. The preference information comprises at least one of allowance/non-allowance of interworking, a type of an interworkable non-CPM service, and priority information of a non-CPM service.

According to another aspect of the present invention, a method is provided for interworking with a non-Converged-Internet Protocol (IP) Messaging (CPM) service in a CPM service provisioning system. The method includes storing, by an eXtension Markup Language (XML) Document Management (XDM) server, preference information of a recipient terminal; receiving, by the XDM server, request for the preference information of the recipient terminal to which a Converged-IP Messaging (CPM) message is to be delivered; and providing, by the XDM server, the stored preference information to the CPM server in response to the request. The preference information comprises at least one of allowance/non-allowance of interworking, a type of an interworkable non-CPM service, and priority information of a non-CPM service.

BRIEF DESCRIPTION OF THE DRAWINGS

The above and other aspects, features, and advantages of certain embodiments of the present invention will become more apparent from the following detailed description when taken in conjunction with the accompanying drawings in which.

DETAILED DESCRIPTION OF EMBODIMENTS OF THE INVENTION

Various embodiments of the present invention will now be described in detail with reference to the annexed drawings. In the drawings, the same or similar elements are denoted by the same reference numerals even though they are depicted in different drawings. In the following description, a detailed description of known functions and configurations incorporated herein has been omitted for clarity and conciseness.

The present invention provides a system and method for interworking a Converged-IP Messaging (CPM) service with other messaging services. In particular, the present invention realizes a function of allowing a CPM service's recipient to receive a message sent from another CPM service's sender using a non-CPM service to which the recipient has subscribed. To this end, the present invention uses preference information of a recipient in determining a non-CPM service to be subjected to interworking. In this way, the CPM service can interwork with non-CPM services, contributing to expansion of an area where services can be provided.

Figure 1:
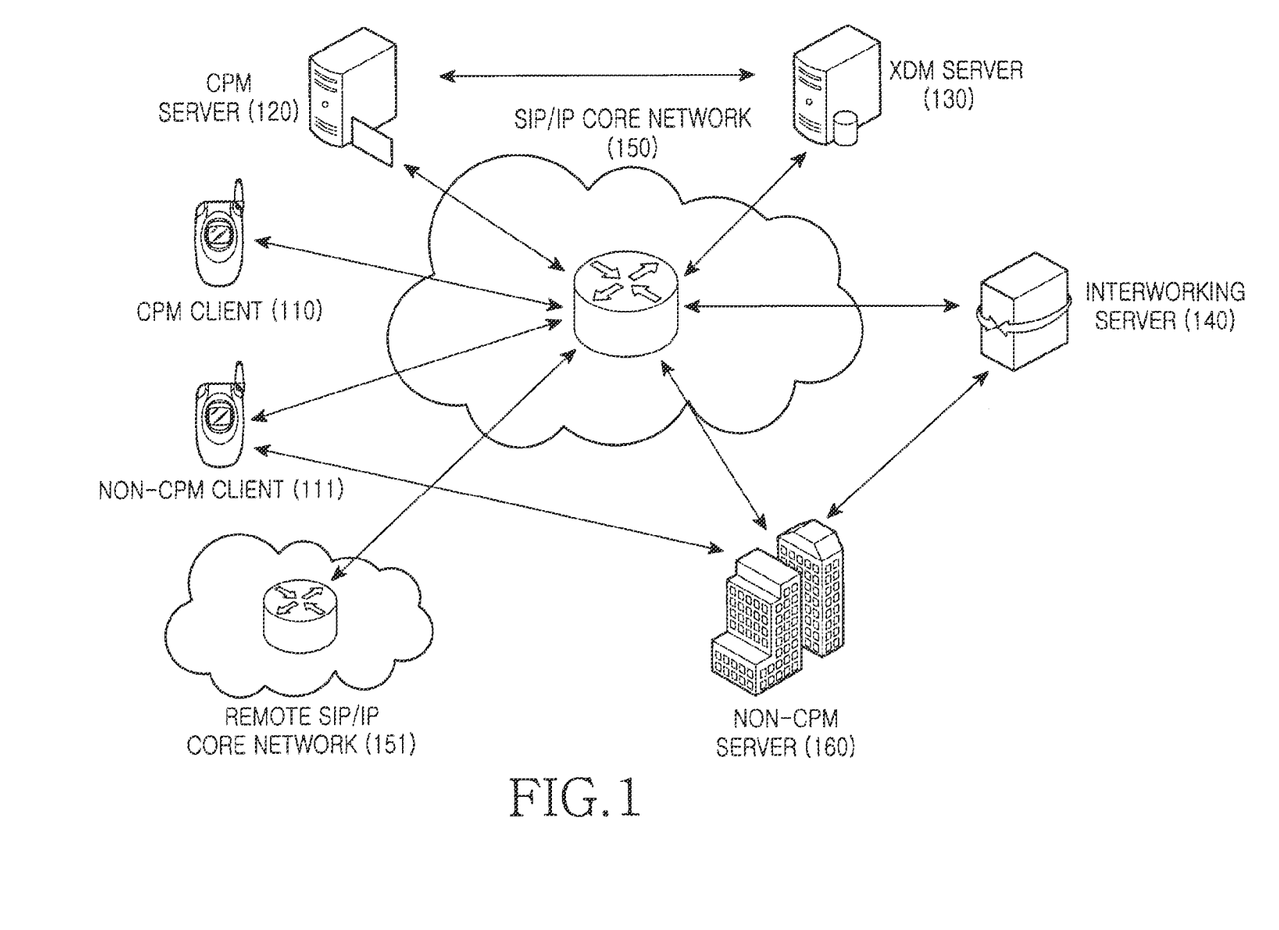
FIG. 1 is a diagram illustrating a configuration of a system for providing a CPM service according to an embodiment of the present invention.

With reference to FIG. 1, a description will now be made of system architecture for interworking a CPM service with non-CPM services. FIG. 1 illustrates components of a system for providing a CPM service, and mutual relationships between the components according to an embodiment of the present invention. Although only major entities constituting the system are shown in brief in FIG. 1 for a better understanding of the invention, more entities can be used in the actual service environment.

Referring to FIG. 1, a CPM service provisioning system includes a CPM client 110, a non-CPM client 111, a CPM server 120, an eXtension Markup Language (XML) Document Management (XDM) server 130, an interworking server 140, a SIP/IP core network 150, a remote SIP/IP core network 151, and a non-CPM server 160.

The CPM client 110 refers to a CPM service subscriber. The CPM client 110 generates a CPM message, sends it to the CPM server 120, and receives from the CPM server 120 a message that another CPM service user or a non-CPM service user sent.

The non-CPM client 111, a non-CPM service subscriber, exchanges messages with a corresponding non-CPM server.

When the CPM client 110 is assumed herein to be a recipient, the recipient should serve as both a CPM service subscriber and a non-CPM service subscriber. This is because only the recipient who has subscribed to the CPM service can use an interworking function, as interworking is one of the functions provided in the CPM service. Further, the recipient should be subscribed even to a non-CPM service in order to receive a message corresponding to the non-CPM service interworking with the CPM service.

The CPM server 120 generally handles a message from the CPM client 110 or another CPM server. The CPM server 120 also serves to handle a message received from the interworking server 140 in order to interwork with the non-CPM service. According to an embodiment of the present invention, the CPM server 120 makes reference to interworking-related preference information, i.e., user's preference information and a service policy, in order to determine in which messaging service type it should deliver a CPM message from a sender to a recipient.

In this manner, the CPM server 120 should handle messages so that the CPM service user can exchange messages with various messaging service users regardless of the message types. The CPM server 120 determines allowance/non-allowance of interworking (i.e., whether interworking is allowed by the CPM service user) and a non-CPM service to be subjected to interworking, depending on interworking-related preference information of the recipient. Such preference information specifies the non-CPM service that the recipient will use instead of the CPM service upon receipt of a message when interworking is allowed. Further, the preference information can also include therein priority information indicating which non-CPM service the user will preferentially use when there are several non-CPM services the user wants.

Since the preference information and service policy are managed by the XDM server 130, the CPM server 120 sends a request for recipient's preference information and a service policy to the XDM server 130. Then the CPM server 120 can handle messages based on the information provided in response to the request. To be specific, the message handling operation can include an operation in which the CPM server 120 routes a message to the interworking server 140 according to the recipient's preference information. For this purpose, the CPM server 120 should be able to carry out a function of requesting the recipient's preference information and analyzing the provided information. This function will be described in detail below.

The XDM server 130 searches for XML resources indicating recipient's preference information requested by an XDM client in the CPM server 120, and provides them to the XDM client. It is assumed herein that the XDM client is implemented in the CPM server 120. Particularly, an embodiment of the present invention uses the XDM server 130 as a database for storing interworking-related preference information. The XDM server 130 performs a function of storing and managing the user's preference information and the service policy. Therefore, an XML Configuration Access Protocol (XCAP) is used herein as an example of a protocol for requesting and delivering the interworking-related preference information.

The present invention defines new XML elements and attributes so as to create XML resources indicating the recipient's preference information searched by the XDM server 130. In other words, the present invention defines new XML elements and attributes so that the XML resources stored/managed by the XDM server 130 may include interworking-related preference information of the CPM service user. The XML elements and attributes newly defined by the present invention are used for specifying the non-CPM service that the user will use instead of the CPM service when he or she receives a message. In addition, when there are several non-CPM services the user desires, the XML elements and attributes are also used for representing even the priority indicating which non-CPM service the user will preferentially enjoy. XML resources including such conditions can be expressed in various forms.

Table 1 illustrates an exemplary structure of XML resources, which is defined in the form that can be added to an extension schema defined in existing OMA XDM_v2.0.

TABLE 1

```
<!--OMA specific "actions" child element extensions to namespace
urn:ietf:params:xml:ns:common-policy -->
<xs:element name="allow-interworking" type="allowinterworkingType"/>
<xs:complexType name="allowinterworkingType">
    <xs:element name="sms" type="noncpmType" minOccurs="0"
    maxOccurs="1"/>
    <xs:element name="mms" type="noncpmType" minOccurs="0"
    maxOccurs="1"/>
    <xs:element name="simple-im" type="noncpmType" minOccurs="0"
maxOccurs="1"/>
    <xs:element name="poc" type="noncpmType" minOccurs="0"
    maxOccurs="1"/>
    <xs:any namespace="##other" processContents="lax"/>
</xs:complex Type>
<xs:complexType name="noncpmType">
    <xs:simpleContent>
        <xs:extension base="xs:boolean"/>
        <xs:attribute name="priority" type="xs:int"/>
        <xs:attribute name="contact"="xs:xxx"/>
    </xs:simpleContent>
</xs:complexType>
```

In Table 1, an element <allow-interworking> indicates allowance/non-allowance of interworking by a CPM service user, and a value of the element <allow-interworking> is set as "true" when the element has more than one child element with a value "true". When a value of the element <allow-interworking> is "true", it means that interworking by the user is requested. On the contrary, the element <allow-interworking> has a value "false" when the user does not allow interworking.

The element <allow-interworking> can have, as its child elements, elements indicating non-CPM services with which the CPM service can interwork, including <sms>, <mms>, <simple-im>, <poc>, etc. Each child element has value "true" or "false", and also has an attribute 'priority' and an attribute 'non-CPM contact'.

Among the child elements <sms>, <mms>, <simple-im> and <poc>, child elements with a value "true" mean non-CPM services, whose interworking with the CPM service is allowed by the user. On the other hand, child elements with a value "false" mean non-CPM services, whose interworking with the CPM service is not allowed by the user.

The attribute 'priority' of a child element represents priority information indicating with which non-CPM service the CPM service will preferentially attempt interworking when it performs interworking. The attribute 'non-CPM contact' represents an address (or contact) that a recipient was assigned when it was subscribing to a corresponding non-CPM service to receive the corresponding non-CPM service. Accordingly, the CPM server 120 preferentially attempts interworking with a non-CPM service indicated by a child element with an attribute 'priority' having a low value among the child elements of the element <allow-interworking> having a value "true". Such priority information can be used for attempting interworking with a non-CPM service having the second highest priority, upon failure to attempt interworking with a non-CPM service having the top priority.

Meanwhile, the XDM server 130, serving as a database for storing user's preference information, stores XML resources in the form of Table 2.

TABLE 2

```
- omitted -
<allow-interworking>
    <simple-im>true;priority="0",
    contact="sip:user@example.com"</simple-im>
    <sms>true;priority="1", contact="01012345678"</sms>
    <mms>true;priority="2", contact="01012345678"</mms>
</allow-interworking>
- omitted -
```

Table 2 illustrates an interworking-related preference information part in the XML resources which are stored in the XDM server 130 using the schema defined in Table 1. In Table 2, when an element <allow-interworking> has a value "true" as in Table 1, it means that a recipient desires to receive a CPM message sent by a sending-side CPM service user, through a non-CPM service. It can be noted in Table 2 that there are several non-CPM services preferred by the recipient, and SIMPLE IM, SMS and MMS are listed in descending order of priority.

The interworking server 140 performs a mutual conversion operation between a message format of the CPM service and a message format of the non-CPM service. In order for the interworking server 140 to be built in a receiving-side network, the receiving-side network should be able to provide the CPM service. Specifically, upon receipt of a message from the CPM server 120, the interworking server 140 converts the received message into a message in the format suitable for the non-CPM service, and sends it to a corresponding non-CPM server. Similarly, upon receiving a message from the non-CPM server 160, the interworking server 140 converts a format of the received message into a message format appropriate for the CPM service, and sends it to the CPM server 120.

In this manner, the interworking server 140 performs a function of converting message formats so as to interwork the CPM service with non-CPM services such as Short Messaging Service, Multimedia Messaging Service, Instant Messaging Service, PTT over Cellular (PoC) service, etc.

The non-CPM server 160 serves to provide messaging services other than the CPM service. The messaging services provided by the non-CPM server 160 can include Short Messaging Service (SMS), Multimedia Messaging Service (MMS), Instant Messaging Service (IMS), PoC, etc.

The SIP/IP core network 150 performs a function of delivering, to a recipient or another entity, control signals for services based on a Session Initiation Protocol (SIP) and messages that their service users or service entities have generated. For this purpose, the SIP/IP core network 150 should be able to exchange messages even with a SIP/IP core network belonging to the opposing service provider's area. The SIP/IP core network 150, a network based on the CPM service, is a network that should be necessarily prepared when it provides the CPM service in the receiving-side network.

The remote SIP/IP core network 151, a SIP/IP core network provided and managed by another network provider (or network operator), is equal in function to the SIP/IP core network 150. Although not illustrated in FIG. 1, the entities and system for providing the CPM service and non-CPM services are built even for the remote SIP/IP core network 151.

By implementing the system for providing the CPM service capable of interworking as described above, it is possible for the user to efficiently use the CPM service and non-CPM services in a combined manner as he or she wants. When each messaging service has a different service fee, such a combination can be efficiently used for allowing the user to use the key functions provided by these services at a lower price. That is, a user, who has subscribed to the CPM service and other non-CPM services, can use the key functions provided by these services at a lower price by efficiently combining the CPM service with the non-CPM services.

For example, when the CPM service and/or each non-CPM service are different in service fee charged for use of the corresponding messaging services, the user who has subscribed to both the CPM service and the non-CPM services may have an opportunity to use the lower-priced services in sending/receiving messages by efficiently combining the CPM service with the non-CPM services. For instance, when a CPM message sent by a sending-side CPM service user includes normal texts as its contents, the receiving-side CPM service user may receive the text contents through an SMS service if the SMS service is lower in service charge.

For a detailed description of an operation of the CPM server 120, operations of function blocks constituting the CPM server 120 will be described with reference to FIG. 2.

Figure 2:
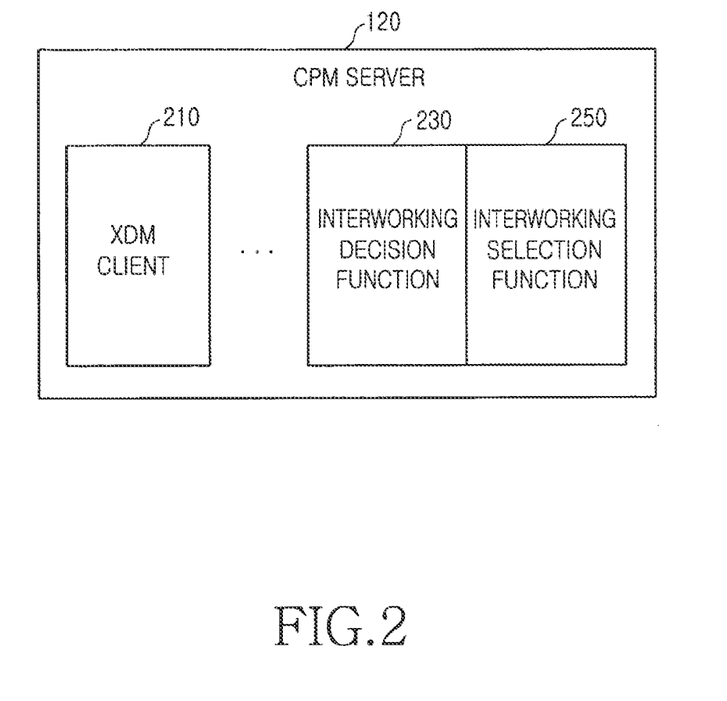
FIG. 2 is a block diagram illustrating an internal structure of a CPM server according to an embodiment of the present invention.

Referring to FIG. 2, the CPM server 120 includes function blocks such as an XDM client (XDMC) 210, an interworking decision function (IWDF) 230, and an interworking selection function (IWSF) 250.

The XDM client 210 performs a function of requesting preference information of a CPM service user and a service policy of a service provider, managed in the XDM server 130. The XDM client 210 can provide some or all of the information provided from the XDM server 130 to function blocks, such as interworking decision function 230 and the interworking selection function 250, via an internal interface.

The interworking decision function 230 is a function block for determining whether it will perform interworking so that a message can be delivered to a recipient, using preference information of the recipient. In other words, the interworking decision function 230 determines whether a signal for requesting execution of interworking is included in the recipient's preference information, and activates the interworking selection function 250 when the request signal is included.

The interworking selection function 250 is a function block for determining through which non-CPM service it will deliver a message to the recipient, using the recipient's preference information. Accordingly, the interworking selection function 250 determines the type of the non-CPM service, which is set in the recipient's preference information. When several interworkable non-CPM services are set in the recipient's preference information, the interworking selection function 250 detects priorities of interworking-allowed non-CPM services. Such priority information is used for attempting interworking with a non-CPM service having the second highest priority, just in case the CPM server 120 fails in interworking after attempting the interworking with a non-CPM service having the top priority.

The CPM server 120, as shown in FIG. 2, includes the interworking decision function 230 and the interworking selection function 250, and so far, the description has been made of an operation in which the CPM server 120 determines allowance/non-allowance of interworking and a non-CPM service to be subjected to interworking. In implementation, however, the interworking decision function 230 and the interworking selection function 250 are subject to change in their position according to a design of the system. For example, the interworking decision function 230 and the interworking selection function 250 can be implemented such that they are both situated in the interworking server 140. As another example, the system can be designed such that the interworking decision function 230 is situated in the CPM server 120 to operate in the CPM server 120, while the interworking selection function 250 is situated in the interworking server 140 to operate in the interworking server 140. As further another example, the interworking decision function 230 can be situated in the CPM server 120 to operate in the CPM server 120, while the interworking selection function 250 can be situated in a separate entity other than the CPM server 120 and the interworking server 140.

In the above-stated exemplary system design, when the interworking decision function 230 or the interworking selection function 250 is situated in an entity (the interworking server 140 or the third entity) other than the CPM server 120, not only the CPM server 120 but also the entity including the interworking decision function 230 or the interworking selection function 250 should include therein the XDM client 210 as an entity for sending a request for recipient's preference information to the XDM server 130 and receiving the recipient's preference information from it.

Figure 3:
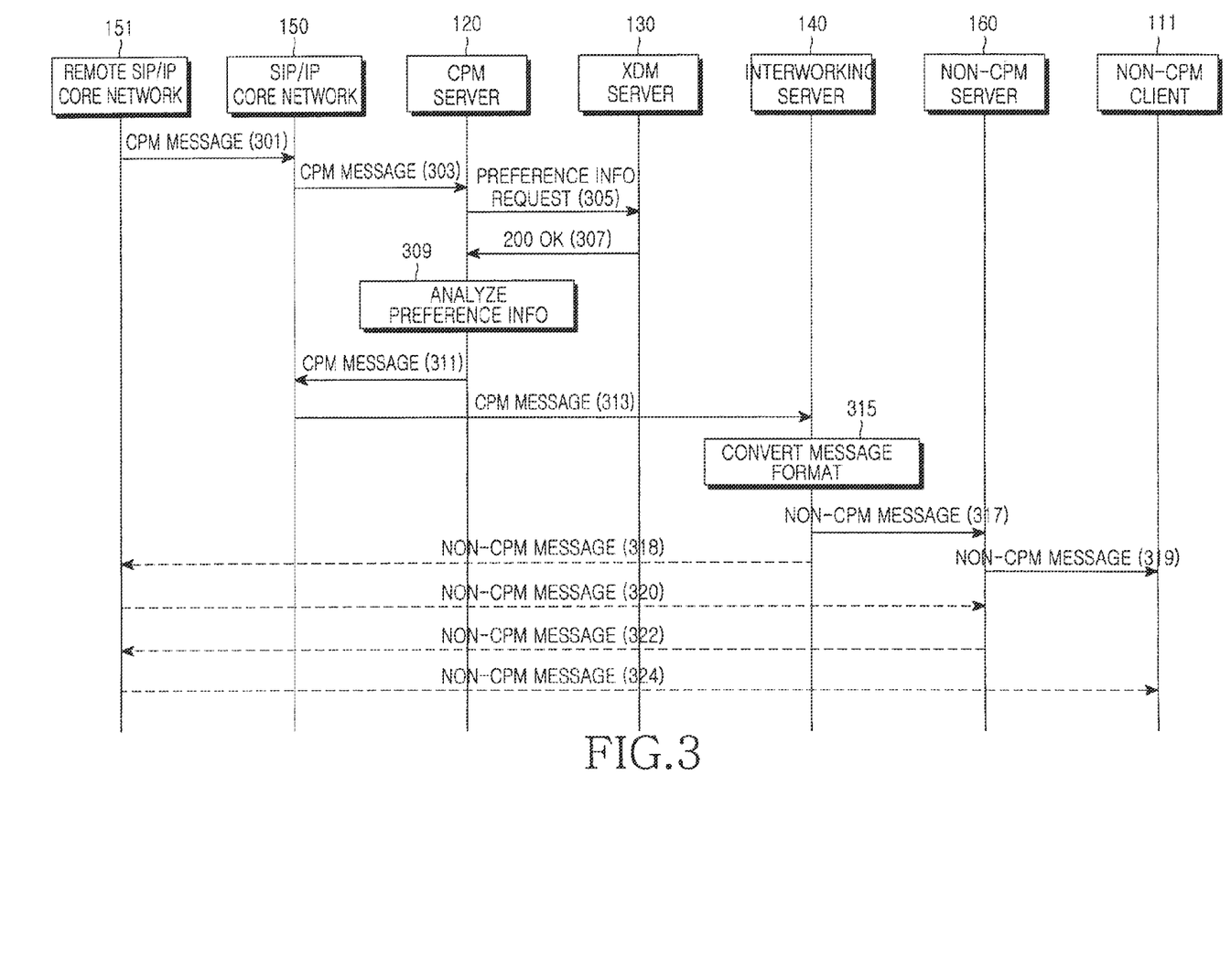
FIG. 3 is a diagram illustrating a signal flow between entities for providing a CPM service according to an embodiment of the present invention.

As described above, the CPM service according to the present invention provides a function of allowing a user to receive a message sent from another CPM service user using a desired messaging service among the messaging services he or she has subscribed, instead of using the CPM service. With reference to FIG. 3, a description will now be made of a process of performing interworking between the entities constituting the system shown in FIG. 1.

FIG. 3 illustrates a process of delivering a message based on a non-CPM service selected by recipient's preference information to a recipient since a message sent by a sender arrived at a receiving-side network. It is assumed in FIG. 3 that a CPM server 120 has the internal structure shown in FIG. 2. In other words, the interworking decision function 230 and the interworking selection function 250 are implemented in the CPM server 120.

Referring to FIG. 3, when a message sender and a recipient belong to different network providers' areas, a receiving-side SIP/IP core network 150 receives a CPM message from a remote SIP/IP core network 151, or sending-side SIP/IP core network, in step 301. However, if the sender and the recipient are located in the same network provider's area, the receiving-side SIP/IP core network 150 receives a CPM message from the sender, with step 301 skipped. In this case, the CPM message is a message sent from the sender, or CPM service user, and since a process in which the message is delivered from the sender to the SIP/IP core network 150 is not directly related to an operating principle of the present invention, the process is not shown in FIG. 3.

Upon receipt of the CPM message, the SIP/IP core network 150 delivers the received CPM message to a CPM server 120 in step 303. To deliver the CPM message to the CPM server 120, the SIP/IP core network 150 uses a routing mechanism predefined by a network provider.

Upon receipt of the CPM message, the CPM server 120 should inquire into preference information to determine whether interworking with a non-CPM service is needed and determine a type of the non-CPM service. Thus, the CPM server 120 must acquire preference information from an XDM server 130 that stores and manages the recipient's preference information. For this purpose, in step 305, the CPM server 120 activates an XDM client 210 situated therein and sends a preference information request message for requesting the recipient's preference information to the XDM server 130. To send the preference information request message to the XDM server 130, the CPM server 120 should know a name of a folder where the preference information is stored, including an address of the XDM server 130. The CPM server 120 may previously have information on the address of the XDM server 130 and the name of the folder, or can acquire the information in another method.

The CPM server 120 generates an XCAP Uniform Resource Identifier (URI) using a recipient's address in the received CPM message, the XDM server's address and the folder's name, and includes it in the preference information request message. An XCAP protocol is used herein for requesting the preference information.

Upon receipt of the preference information request message, the XDM server 130 checks whether XML resources indicated by the XCAP URI included in the received preference information request message are stored in the XDM server 130. The check process is achieved according to the details described in the XDM standard document provided by Open Mobile Alliance (OMA). In other words, the XDM server 130 checks if there is recipient's preference information corresponding to XML resources indicated by the XCAP URI.

When the corresponding preference information is stored therein, the XDM server 130 generates a 200 OK message including the detected preference information, and sends it to the CPM server 120 in step 307. In this case, the XML resources indicating the requested recipient's preference information can be included in a body part of the 200 OK message. Also, the XCAP protocol is used for sending the 200 OK message including the detected preference information to the CPM server 120. As an example of XML resources indicating the detected preference information, the XML resources having the schema shown in Table 1 are included in the body part of the 200 OK message.

Upon receipt of the 200 OK message, the CPM server 120 analyzes the recipient's preference information included in the received 200 OK message in step 309. An interworking decision function 230 and an interworking selection function 250 are used as function blocks for such analysis. The CPM server 120 activates the interworking decision function 230 to determine allowance/non-allowance of interworking. When the recipient's preference information follows the schema shown in Table 1, the interworking decision function 230 detects a value of an element <allow-interworking> indicating whether interworking is allowed by the CPM service user, through preference information analysis. When a value of the element <allow-interworking> is "true", the interworking decision function 230 recognizes that it should perform interworking.

When the CPM server 120 should perform interworking, it activates the interworking selection function 250 to determine which non-CPM service it will select. Then the interworking selection function 250 analyzes values of child elements of the element <allow-interworking> and a value of an attribute 'priority' of each child element on a comparison basis. In this manner, the interworking selection function 250 detects interworking-allowed non-CPM services, and determines interworking order for the detected non-CPM services according to a value of their attribute 'priority'.

After determining the non-CPM service to be subjected to interworking, the CPM server 120 should deliver the CPM message to an interworking server 140 that will take charge of the interworking. That is, the CPM message is forwarded to the interworking server 140 that manages interworking with the determined non-CPM service. Message exchange between the CPM server 120 and the interworking server 140 is carried out through the SIP/IP core network 150. To be specific, the CPM server 120 delivers the CPM message to the receiving-side SIP/IP core network 150 in step 311, and the receiving-side SIP/IP core network 150 forwards it to the interworking server 140 through a routing mechanism in step 313.

In order to correctly route the CPM message to the interworking server 140, the CPM server 120 can add information necessary for the routing to the CPM message and send it to the SIP/IP core network 150, rather than forwarding the received CPM message to the SIP/IP core network 150 intactly.

The information necessary for routing of the CPM message may depend on how the system is designed. Hence, the present invention provides the following methods for correct delivery of the CPM message.

First, the CPM server 120 can deliver the CPM message in the following manner when it knows an address of the interworking server 140. Specifically, when sending the CPM message to the SIP/IP core network 150, the CPM server 120 can set a Request-URI of the CPM message to the address of the interworking server 140, that it already knows. For example, when the determined non-CPM service is still SMS and the CPM server 120 knows an address of an interworking server capable of interworking with SMS, the CPM server 120 can set an address of the corresponding interworking server as a Request-URI of the CPM message and send it to the SIP/IP core network 150. The method of changing the Request-URI of the CPM message is advantageous in that it can deliver the message to the interworking server 140 without changing the existing routing rule of the SIP/IP core network 150.

Second, the CPM server 120 can deliver the CPM message in the following manner when it cannot know an address of the interworking server 140. In this case, the CPM server 120 can include in the CPM message an identifier instructing the SIP/IP core network 150 to deliver the CPM message to the corresponding interworking server 140, and send it to the SIP/IP core network 150. A feature tag can be used as an identifier used for this purpose. However, when this method is used, a routing rule should be defined, to which the SIP/IP core network 150 can make reference by means of a particular tag.

In the following description, when the determined non-CPM service is, for example, SMS and an address of the interworking server 140 capable of interworking with the SMS is unknown, '+g.oma.cpm-sms' can be defined as a feature tag used for interworking with the SMS. Such a feature tag is inserted in a header "Accept-Contact" of the CPM message. Thus, the CPM server 120 can send the CPM message to the SIP/IP core network 150 after inserting '+g.oma.cpm-sms' in the header. In this case, the CPM service provider should define a routing rule to which the SIP/IP core network 150 can make reference using the defined feature tag '+g.oma.cpm-sms', and in which it can deliver the CPM message to an interworking server in charge of SMS. For example, such a routing rule can be defined as Table 3.

TABLE 3

Note: Terminating Filter Criteria is indexed based on the Request-URI..
CASE method="INVITE" AND header="Accept-Contact" = "+g.oma.cpm-sms"
    THEN: ROUTE request to the specified SMS interworking Server Originating Port Address
CASE method="MESSAGE" AND header="Accept-Contact" = "+g.oma.cpm-sms"
    THEN: ROUTE request to the specified SMS interworking Server Originating Port Address Table 3 illustrates a routing rule for a case where the CPM server 120 cannot know an address of the interworking server 140, especially illustrates a routing rule to which reference can be made using '+g.oma.cpm-sms'. The routing rule shown in Table 3 means that when 'method' of a CPM message indicates SIP INVITE or SIP MESSAGE, and a header "Accept-Contact" includes a feature tag '+g.oma.cpm-sms', the CPM message should be routed to an interworking server in charge of interworking with SMS. The CPM service provider can adjust application order of the routing rule shown in Table 3 and the existing routing rules so that the CPM message should be routed to the interworking server 140 after it is first delivered to the CPM server 120.

Meanwhile, when the interworking server 140 receives the CPM message from the SIP/IP core network 150 in step 313, the interworking server 140 converts a format of the CPM message into a message format corresponding to the non-CPM service determined through the preference information analysis in step 315. In this way, the interworking server 140 converts a format of the CPM message into a format readable by a non-CPM server 160 covered by the interworking server 140 itself, and a non-CPM message made through the conversion is delivered to the non-CPM server 160 in step 317.

When the non-CPM server 160 is a server that provides such services as Short Messaging Service and Multimedia Messaging Service, these services are not based on SIP. Therefore, the non-CPM message converted by the interworking server 140 is delivered to a non-CPM client 111 corresponding to a recipient via the non-CPM server 160 in steps 317 and 319, without passing through the SIP/IP core network 150.

On the other hand, when the non-CPM server 160 is a server that provides such service as Instant Messaging Service and PoC, these services are based on SIP. Hence, the non-CPM message from the interworking server 140 should pass through the SIP/IP core network 150. Thus, in steps 318 and 320, the non-CPM message from the interworking server 140 is routed to the non-CPM server 160 by way of the SIP/IP core network 150. In steps 322 and 324, the non-CPM server 160 delivers the non-CPM message to the non-CPM client 111 again through the SIP/IP core network 150.

Shown in FIG. 3 is a message flow for a case where the interworking decision function 230 and the interworking selection function 250 are both implemented in the CPM server 120. Message transfer between the CPM server 120 and the interworking decision function 230 and between the interworking decision function 230 and the interworking selection function 250 is not shown in FIG. 3, since it is internally processed in the system. However, the interworking decision function 230 can be situated in the CPM server 120, while the interworking selection function 250 can be implemented as an independent entity.

Figure 4:
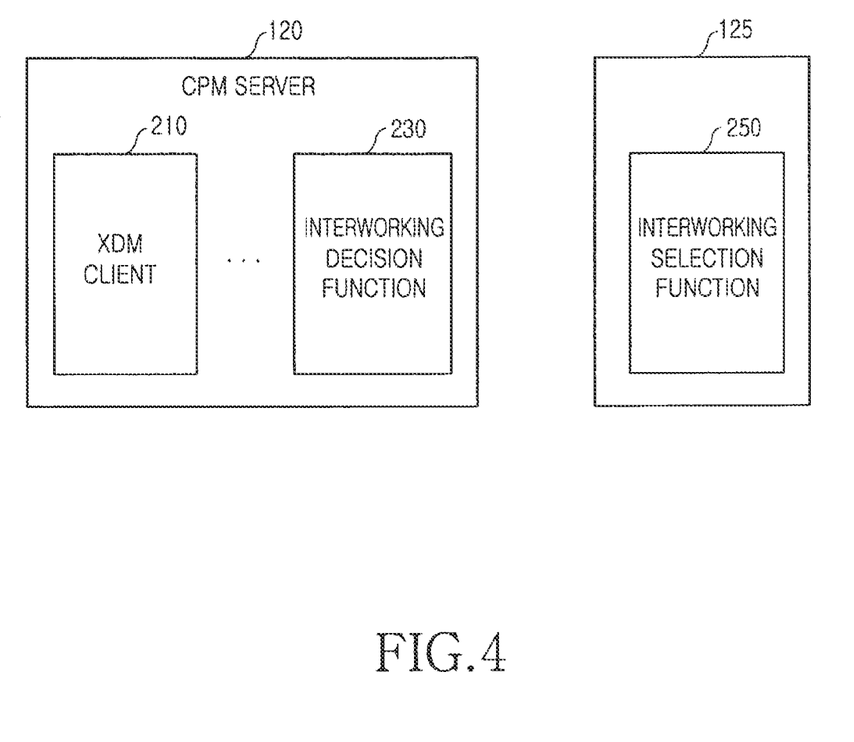
FIG. 4 is a block diagram illustrating an interworking selection function implemented as an independent entity according to an embodiment of the present invention.

FIG. 4 illustrates the case where an interworking selection function is implemented as an independent entity according to an embodiment of the present invention. Referring to FIG. 4, the interworking selection function 250 is situated in a separate entity 125 other than the CPM server 120. Otherwise, the interworking selection function 250 can also be placed in the interworking server 140.

Figure 5:
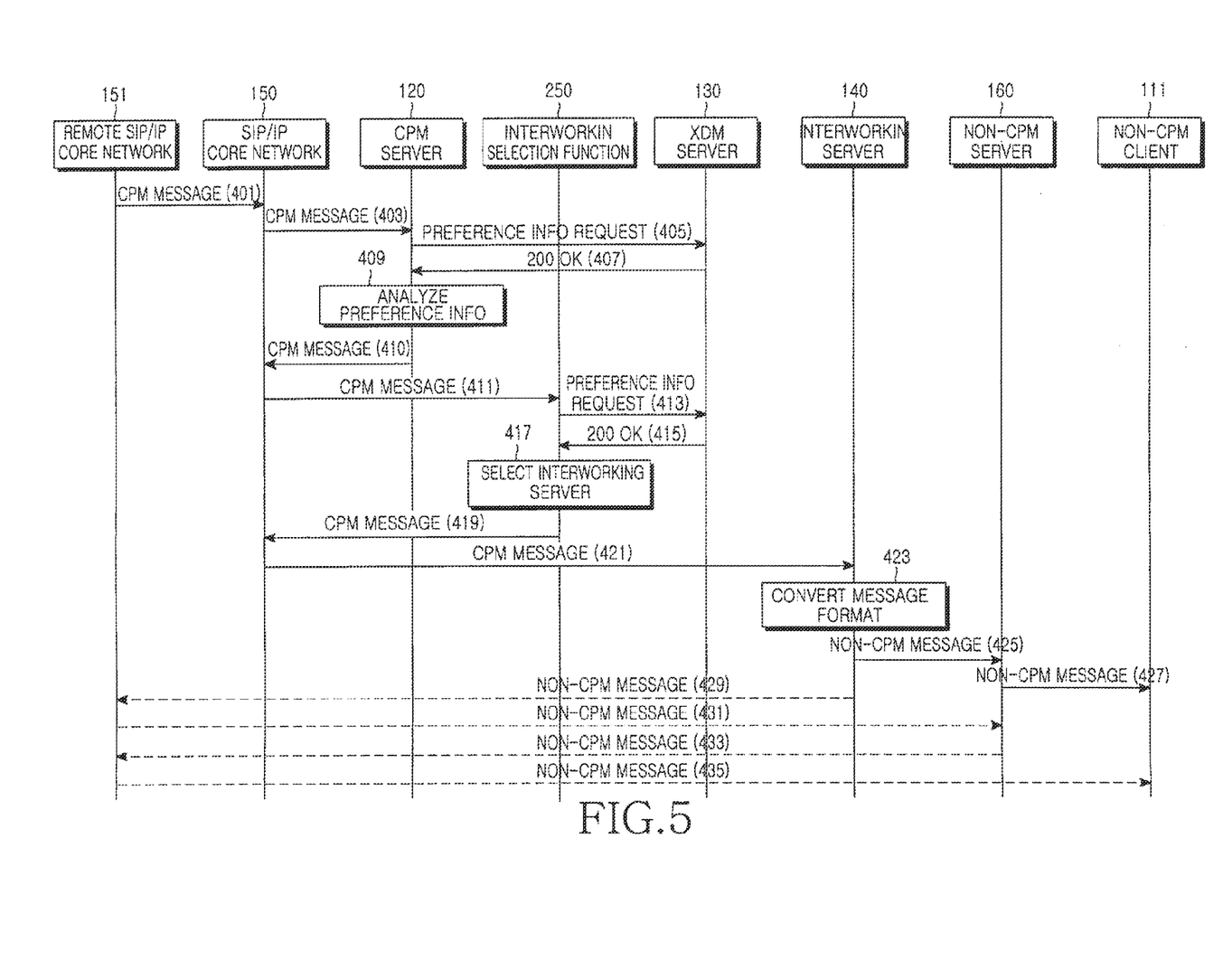
FIG. 5 is a diagram illustrating a signal flow between entities for providing a CPM service according to another embodiment of the present invention.

With reference to FIG. 5, a description will now be made of a message flow between the entities when the interworking selection function 250 is implemented in the CPM server 120 as an independent entity.

FIG. 5 is a diagram illustrating a signal flow between entities for providing a CPM service according to another embodiment of the present invention. Since steps 421 to 435 of FIG. 5 are similar to steps 313 to 324 of FIG. 3, a detailed description thereof is omitted. Also, the description relevant to each step can be applied to the corresponding step of FIG. 5.

Referring to FIG. 5, when a SIP/IP core network 150 receives a CPM message in step 401, it delivers the received CPM message to a CPM server 120 in step 403. Upon receipt of the CPM message, the CPM server 120 should inquire into preference information to determine whether interworking with a non-CPM service is needed.

The CPM server 120 in FIG. 3 sends to the XDM server 130 a request for recipient's preference information used for determining whether interworking with a non-CPM service is necessary and deciding a type of the non-CPM service, whereas the CPM server 120 in FIG. 5 has no need to determine a type of the non-CPM service since it does not include the interworking selection function 250.

Thus, according to this embodiment, the CPM server 120 sends a preference information request message to an XDM server 130 in step 405, to request information used for determining whether interworking with a non-CPM service is necessary. At this point, the CPM server 120 activates an XDM client 210.

Upon receipt of the preference information request message, the XDM server 130 checks if there is recipient's preference information corresponding to the received preference information request message.

If the corresponding preference information is stored, the XDM server 130 generates a 200 OK message including the detected preference information, and sends it to the CPM server 120 in step 407.

Upon receipt of the 200 OK message, the CPM server 120 analyzes recipient's preference information included in the received 200 OK message in step 409. To be specific, an interworking decision function 230 included in the CPM server 120 determines whether to perform interworking, based on the recipient's preference information. When the CPM server 120 decides to perform interworking, it delivers the CPM message to the interworking selection function 250 in step 411.

In other words, after completing the preference information analysis in step 409, the CPM server 120 delivers the CPM message to the SIP/IP core network 150 in step 410. The SIP/IP core network 150 forwards the CPM message to the interworking selection function 250 or an entity 125 with the interworking selection function 250 in step 411.

In step 413, the interworking selection function 250 sends a preference information request message to the XDM server 130 to request interworking preference information of the message recipient. Preferably, the interworking selection function 250 can send to the XDM server 130 a request for interworking preference information necessary for determining a type of the non-CPM service.

According to another embodiment, when the CPM server 120 receives from the XDM server 130 the information necessary for determining a type of the non-CPM service in step 407, it can send a request for the interworking preference information to the XDM server 130. In response, the XDM server 130 generates a 200 OK message including the requested preference information and sends it to the CPM server 120 in step 415.

Upon receipt of the preference information, the interworking selection function 250 selects an interworking server 140 based on the preference information. Specifically, upon receipt of the preference information, the interworking selection function 250 selects a type of the non-CPM service based on the preference information, and selects the interworking server 140 corresponding thereto in step 417.

Thereafter, in steps 419 and 421, the interworking selection function 250 delivers the CPM message to the corresponding interworking server 140 via the SIP/IP core network 150. The succeeding process is equal to that of FIG. 3, so a detailed description thereof will be omitted. In order for the CPM server 120 to send a message to the interworking selection function 250 in the above process, the two methods can be used intact, which are proposed in FIG. 3 such that the CPM server 120 can deliver a message to the interworking server 140. That is, when the CPM server 120 knows an address of an entity including the interworking selection function 250, the CPM server 120 can write the address of the corresponding entity in a Request-URI of the message it will send. However, if the CPM server 120 has no information on the address of the entity including the interworking selection function 250, the CPM server 120 can define a feature tag of a new type to define a routing rule to the entity including the interworking selection function 250, and can apply it to the routing rule in the method specified in Table 3.

As is apparent from the foregoing description, the CPM service according to the present invention can support not only the communication between CPM service users, but also the communication between a CPM service user and a non-CPM service user. Therefore, even a recipient, who has subscribed to the CPM service, can receive a message using a desired non-CPM service, having an opportunity to use the cheaper services.

The present invention allows the CPM service to interwork with the existing non-CPM services to extend the possible service area, making it possible to provide more various scenarios to the users, compared with the existing services.

Further, the present invention allows the CPM service to complementally operate with the existing messaging services as well as to replace the existing messaging services, thereby contributing to an increase in competitiveness of the CPM service.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A Converged-Internet Protocol (IP) Messaging (CPM) service provisioning system comprising a CPM server, the CPM server comprising:
    an eXtension Markup Language (XML) Document Management (XDM) client for sending a request for preference information of a recipient terminal to which the CPM message is to be delivered, and receiving the preference information in response to the request from an XDM server that stores and manages the preference information of the recipient terminal; and
    an interworking selection entity for determining a non-CPM service to be subjected to interworking depending on the received preference information, and delivering the CPM message to an interworking server that interworks with the determined non-CPM service.

2. The CPM service provisioning system of claim 1, further comprising the XDM server for storing and managing the preference information of the recipient terminal.

3. The CPM service provisioning system of claim 1, further comprising the interworking server for converting a format of the CPM message into a message format corresponding to the non-CPM service, and delivering the converted non-CPM message to the recipient terminal.

4. The CPM service provisioning system of claim 3, further comprising a Session Initiation Protocol (SIP)/IP core network for sending the CPM message to the CPM server, and delivering another CPM message from the CPM server to the interworking server.

5. The CPM service provisioning system of claim 4, wherein the interworking server delivers the converted non-CPM message to the recipient terminal through the SIP/IP core network based on determining that non-CPM service is related to an SIP.

6. The CPM service provisioning system of claim 1, wherein the non-CPM service comprises at least one of a Short Messaging Service, a Multimedia Messaging Service, an Instant Messaging Service, and a Push-To-Talk (PTT) over Cellular (PoC) service.

7. The CPM service provisioning system of claim 1, wherein the preference information comprises at least one of allowance/non-allowance of interworking, a type of an interworkable non-CPM service, and priority information of the non-CPM service.

8. The CPM service provisioning system of claim 1, wherein the CPM server further comprises an interworking decision entity for determining whether to perform the interworking depending on the received preference information.

9. A method for interworking with a non-Converged-Internet Protocol (IP) Messaging (CPM) service in a CPM service provisioning system, the method comprising:
sending, by a CPM server, a request for preference information of a recipient terminal to which the CPM message is to be delivered;
receiving, by the CPM server, the preference information in response to the request from an eXtension Markup Language (XML) Document Management (XDM) server that stores and manages the preference information of the recipient terminal;
determining, by the CPM server, a non-CPM service to be subjected to interworking depending on the received preference information; and
delivering, by the CPM server, the CPM message to an interworking server that interworks with the determined non-CPM service.

10. The method of claim 9, wherein the non-CPM service comprises at least one of a Short Messaging Service, a Multimedia Messaging Service, an Instant Messaging Service, and a Push-To-Talk (PTT) over Cellular (PoC) service.

11. The method of claim 9, wherein the preference information comprises at least one of allowance/non-allowance of interworking, a type of an interworkable non-CPM service, priority information of the non-CPM service, and a non-CPM service address assigned to the recipient terminal.

12. The method of claim 9, further comprising determining whether to perform the interworking depending on the received preference information.

13. The method of claim 9, further comprising:
converting, by the interworking server, the received CPM message into a message format corresponding to the determined non-CPM service; and
delivering, by the interworking server, the converted non-CPM message to the recipient terminal.

14. The method of claim 9, wherein delivering the converted non-CPM message to the recipient terminal comprises delivering the non-CPM message through a Session Initiation Protocol (SIP)/IP core network based on determining that non-CPM service is related to on an SIP.

15. The method of claim 9, wherein the preference information is requested and received using an XML Configuration Access Protocol (XCAP) protocol.

16. A Converged-Internet Protocol (IP) Messaging (CPM) service provisioning system for interworking with a non-CPM service, the system comprising:
an interworking selection entity for sending, to an eXtension Markup Language (XML) Document Management (XDM) server, a request for preference information of a recipient terminal to which the CPM message is to be delivered, determining the non-CPM service to be subjected to the interworking depending on the preference information from the XDM server, and delivering the CPM message to an interworking server that interworks with the determined non-CPM service; and
a CPM server for sending, to the XDM server, a request for the preference information of the recipient terminal to which the CPM message is to be delivered, determining whether to perform the interworking depending on the preference information from the XDM server, and sending the CPM message to the interworking selection entity, when the CPM server determines to perform the interworking.

17. The CPM service provisioning system of claim 16, further comprising the XDM server for storing and managing the preference information of the recipient terminal.

18. The CPM service provisioning system of claim 16, further comprising the interworking server for converting a format of a CPM message into a message format corresponding to the non-CPM service, and delivering the converted non-CPM service, and delivering the converted non-CPM message to the recipient terminal.

19. The CPM service provisioning system of claim 18, further comprising a Session Initiation Protocol (SIP)/IP core network for sending the CPM message to the CPM server and the interworking selection entity, and delivering another CPM message from the interworking selection entity to the interworking server.

20. The CPM service provisioning system of claim 19, wherein the interworking server delivers the converted non-CPM message to the recipient terminal through the SIP/IP core network when the determined non-CPM service is based on an SIP.

21. The CPM service provisioning system of claim 16, wherein the non-CPM service comprises at least one of a Short Messaging Service, a Multimedia Messaging Service, an Instant Messaging Service, and a Push-To-Talk (PTT) over Cellular (PoC) service.

22. The CPM service provisioning system of claim 16, wherein the preference information that the interworking selection entity receives comprises at least one of a type of an interworkable non-CPM service and priority information of the non-CPM service.

23. The CPM service provisioning system of claim 16, wherein the preference information received by the CPM server includes allowance/non-allowance of the interworking.

24. The CPM service provisioning system of claim 16, wherein the CPM server comprises:
an XDM client for sending a request for the preference information of the recipient terminal to the XDM server; and
an interworking decision function for determining whether to perform the interworking depending on the preference information of the recipient terminal.

25. A non-Converged-Internet Protocol (IP) Messaging (CPM) service terminal comprising:
a processor for generating preference information to interwork with a CPM service terminal;

a transceiver for transmitting the preference information to an eXtension Markup Language (XML) Document Management (XDM) server that stores and manages the preference information and for receiving a converted message from an interworking server, wherein a message format of the converted message corresponds to a non-CPM service that is subjected to interworking depending on the preference information; and an interworking selection entity for determining the non-CPM service to be subjected to the interworking depending on the received preference information, and delivering the CPM message to an interworking server that interworks with the determined non-CPM service.

26. The non-CPM service terminal of claim 25, wherein the non-CPM service comprises at least one of a Short Messaging Service, a Multimedia Messaging Service, an Instant Messaging Service, and a Push-To-Talk (PTT) over Cellular (PoC) service.

27. The non-CPM service terminal of claim 25, wherein the preference information comprises at least one of allowance/non-allowance of interworking, a type of an interworkable non-CPM service, and priority information of the non-CPM service.

28. A method for interworking with a non-Converged-Internet Protocol (IP) Messaging (CPM) service in a CPM service provisioning system, the method comprising:
  generating, by a terminal, preference information to interwork with a CPM service terminal;
  transmitting, by the terminal, the preference information to an eXtension Markup Language (XML) Document Management (XDM) server that stores and manages the preference information; and
  receiving, by the terminal, a converted message from an interworking server,
  wherein a message format of the converted message corresponds to a non-CPM service which is subjected to interworking, depending on the preference information.

29. The method of claim 28, wherein the non-CPM service comprises at least one of a Short Messaging Service, a Multimedia Messaging Service, an Instant Messaging Service, and a Push-To-Talk (PTT) over Cellular (PoC) service.

30. The method of claim 28, wherein the preference information comprises at least one of allowance/non-allowance of interworking, a type of an interworkable non-CPM service, and priority information of the non-CPM service.

31. An interworking server comprising:
  a transceiver for receiving a Converged-Internet Protocol (IP) Messaging (CPM) message which is selectively delivered from a CPM server based on preference information of a recipient terminal; and
  a processor for converting the CPM message into a non-CPM message corresponding to a non-CPM service which is subjected to interworking depending on the preference information,
  wherein the transceiver delivers the converted non-CPM message to the recipient terminal.

32. The interworking server of claim 31, wherein the CPM message is selectively delivered to the interworking server based on an address of a corresponding interworking server or an identifier instructing to deliver the CPM message to the corresponding interworking server.

33. A method for interworking with a non-Converged-Internet Protocol (IP) Messaging (CPM) service in a CPM service provisioning system, the method comprising:
  receiving, by an interworking server, a Converged-IP Messaging (CPM) message which is selectively delivered from a CPM server based on preference information of a recipient terminal;
  converting, by the interworking server, the CPM message into a non-CPM message corresponding to a non-CPM service which is subjected to interworking depending on the preference information; and
  delivering, by the interworking server, the converted non-CPM message to the recipient terminal.

34. The method of claim 33, wherein the CPM message is selectively delivered to the interworking server based on an address of a corresponding interworking server or an identifier instructing to deliver the CPM message to the corresponding interworking server.

35. An eXtension Markup Language (XML) Document Management (XDM) server comprising:
  a memory for storing preference information of a recipient terminal; and
  a transceiver for receiving request for the preference information of the recipient terminal to which a Converged-Internet Protocol (IP) Messaging (CPM) message is to be delivered, and providing the stored preference information to the CPM server in response to the request,
  wherein the preference information comprises at least one of allowance/non-allowance of interworking, a type of an interworkable non-CPM service, and priority information of a non-CPM service.

36. A method for interworking with a non-Converged-Internet Protocol (IP) Messaging (CPM) service in a CPM service provisioning system, the method comprising:
  storing, by an eXtension Markup Language (XML) Document Management (XDM) server, preference information of a recipient terminal;
  receiving, by the XDM server, request for the preference information of the recipient terminal to which a Converged-IP Messaging (CPM) message is to be delivered; and
  providing, by the XDM server, the stored preference information to the CPM server in response to the request,
  wherein the preference information comprises at least one of allowance/non-allowance of interworking, a type of an interworkable non-CPM service, and priority information of a non-CPM service.

* * * * *